United States Patent [19]

Quardt et al.

[11] Patent Number: 5,194,966
[45] Date of Patent: Mar. 16, 1993

[54] OPTICAL SCANNER THRESHOLD SETTING METHOD AND SHEET

[75] Inventors: Dennis Quardt, Morris County; Ker-Ming Chang, Mercer County, both of N.J.

[73] Assignee: Educational Testing Service, Princeton, N.J.

[21] Appl. No.: 616,134

[22] Filed: Nov. 20, 1990

[51] Int. Cl.$^5$ ............................................... H04N 1/00
[52] U.S. Cl. ..................................... 358/406; 358/408; 358/465; 358/466; 358/486; 358/488
[58] Field of Search ............... 358/406, 408, 465, 466, 358/486, 488

[56] References Cited

U.S. PATENT DOCUMENTS

| | | | |
|---|---|---|---|
| 3,675,201 | 7/1972 | McKissick et al. | 340/146.3 AG |
| 4,408,231 | 10/1983 | Bushaw et al. | 358/280 |
| 4,575,581 | 3/1986 | Langberg | 178/18 |
| 4,605,970 | 8/1986 | Hawkins | 358/265 |
| 4,974,098 | 11/1990 | Miyakawa et al. | 358/406 |

Primary Examiner—Edward L. Coles, Sr.
Assistant Examiner—Chi V. Lam
Attorney, Agent, or Firm—White & Case

[57] ABSTRACT

A method for the optimization of optical scanners by automatically determining image processing threshold values using a novel threshold calibration sheet. The calibration sheet image has lines at a forty-five degree angle to the path of the document through the scanner and has a predetermined image dot count. One embodiment comprises the steps of repetitively scanning the sheet until scanner threshold values which satisfy predetermined relationships with said dot count are determined. Another embodiment comprises the steps of a single calibration scan with multiple processing of the gray scale scan data on a host computer. By using this method, two or more scanner cameras can work together on processing document images and consistently give uniform results, independent of their individual technical operating or performance differences.

3 Claims, 2 Drawing Sheets

OPTICAL SCANNER THRESHOLD SETTING METHOD AND SHEET

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all rights whatsoever in copyright.

TECHNICAL FIELD

This invention relates to a method for the optimization of optical scanners by automatically determining image processing threshold values using novel threshold calibration sheets

BACKGROUND OF THE INVENTION

Optical character scanners are devices for digitizing documents by converting character images on the document into digital data form for subsequent use in analyzing, storing and reprinting a copy of the original so as to eliminate hours of tedious typing. Optical scanners are currently used in a variety of applications to perform steps which were previously executed manually.

Optical scanners are well known in the art. In such systems, a light source is typically directed toward the document while an array of photodetectors scans the document. During scanning, the array detects light reflected from the images on the document. Digital data is generated corresponding to the detected light, and thus, to the image on the document from which data is being generated relative to a reference location.

The use of optical scanners for reproducing typed form documents and the like has been somewhat limited by the difficulty realized in calibrating the imaging system to differentiate between characters comprising the text to be reproduced via the optical scanner and aberrant marks or poorly formed characters which cannot be recognized by the scanning system. A poorly calibrated system results in a failure of the scanning system to retrieve all of the data required by the operator.

The calibration of optical scanners is typically effected by a manual process wherein the scanner user is required to optimize various threshold parameters by visual comparisons of the resulting images in order to ensure that all of the text is converted digitally without causing the scanner to detect "ghost" images or otherwise "misread" the image.

Various methods have been proposed in the art for calibrating optical scanners. For example, U.S. Pat. No. 4,408,231 discloses a method for calibrating a photosensitive scanning array wherein a linear image sensor and the video channel associated with the sensor are calibrated to maximize the video signal available. The useable video signal is maximized by calibrating the sensor relative to the range of the analog-to-digital converter. The sensor is calibrated by adjusting its exposure to illumination. The adjustment may be made by adjusting the illumination source or by changing the sampling interval. The gain is adjusted by using a variable gain amplifier. A microprocessor monitors the digitized video signal and controls the exposure and gain to calibrate the sensor and channel.

U.S. Pat. No. 4,605,970 discloses a method and apparatus for calibrating an optical document digitizer in which the calibration mechanism is mounted to a rotatable drum of the digitizer for such purpose. The apparatus comprises an elongated strip having an optical pattern of contrasting light and dark areas on the surface thereof, the pattern including plural discrete blocks, each of the blocks having first and second orthogonal edges wherein the first edges are positioned along a scanning reference line.

A need in the art exists for a relatively inexpensive and practical method suitable for reliably calibrating an optical scanner which does not utilize the cumbersome and expensive apparatus or the time consuming subjective manual approach of prior art systems.

SUMMARY OF THE INVENTION

The present invention relates to a method for calibrating an optical scanner by determining optimal threshold values which comprises the steps of repetitively scanning a unique calibration sheet with predetermined dot counts until lower, upper and processed threshold final values are determined which satisfy predetermined relationships with said dot counts and setting the lower, upper and processed threshold values to their respective final values. By basing the calibration on a scan of a calibration sheet with predetermined dot counts, two or more scanner cameras can work together on processing document images and consistently give uniform results, independent of their individual technical operating or performance differences.

DETAILED DESCRIPTION OF THE INVENTION

Figure 1:
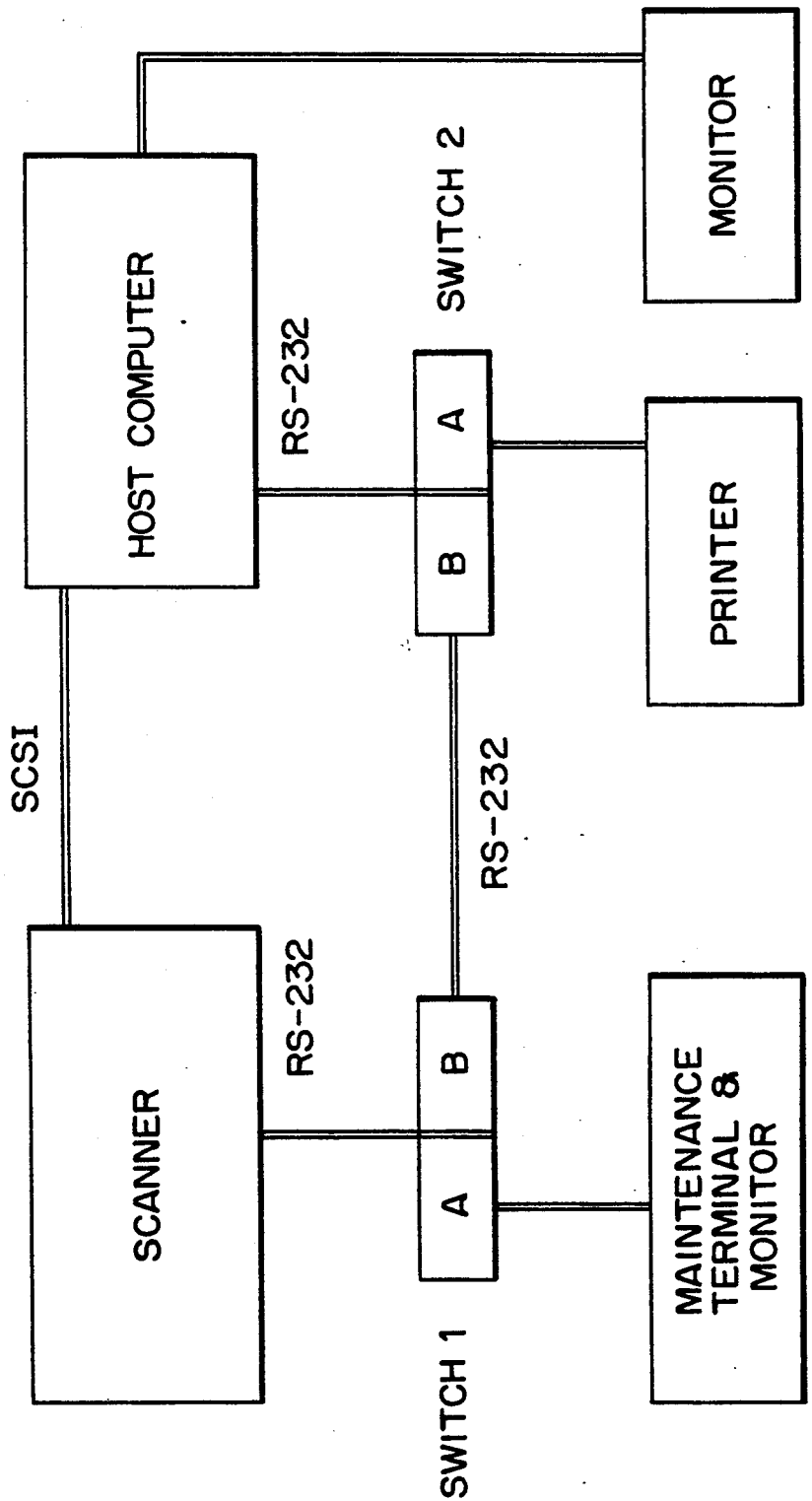
FIG. 1 shows a preferred embodiment arrangement of scanner, printer, host computer, communication means and switches.
Figure 2:
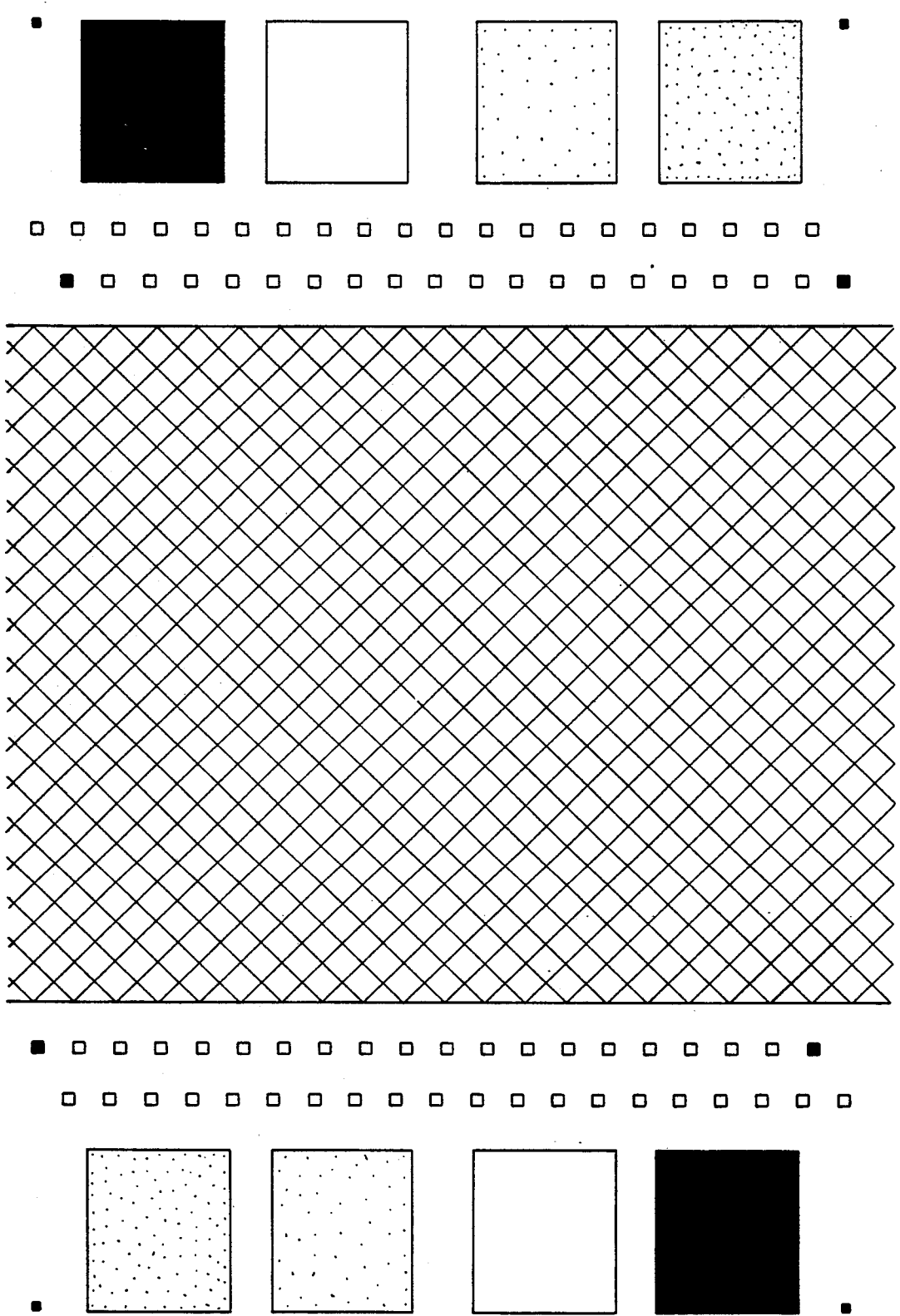
FIG. 2 shows one side of a preferred embodiment of a calibration sheet, the reverse side being a duplicate of the side shown.

The present invention relates to a method for optimizing or calibrating an optical scanner which utilizes an automated computer controlled scheme. Applicants have discovered that an optical scanner can be conveniently calibrated by utilizing a novel and nonobvious calibration sheet which allows for the calculation of optimum threshold values for maximizing the utility of the optical scanner. The same calibration sheets may be used for calibrating different cameras and scanners resulting in a uniformity of image processing across multiple scanners.

Optical scanners known in the art can be calibrated by the method according to the present invention. One example is the Photomatrix Document Scanner. The Photomatrix is a dual sided scanning device with two cameras which can scan, compress, and transmit to a host computer digitized images of paper documents. This operation can either be controlled by an operator entering commands via the operator's console or via a host control interface. The scanner's optical system illuminates the document with light of a specified wavelength. The image is reflected by a mirror through a lens onto charge coupled devices ("CCD's"). The light source is a halogen light. The amount of time that the CCD's are exposed to the projected image, as well as the brightness intensity of the light affects the quality of raw data that results from a scan.

The CCD's provide the raw data in the form of an analog signal. Initially, the analog signal is converted by analog-to-digital converters to a 256 grey scale digital signal. The grey scale signal is processed and converted to a binary digital, black dot or white dot signal for final use. As the intensity of the light may vary from lamp to lamp as well as over time, in order to minimize inaccuracies or inconsistencies, several user-defined constants, or thresholds are utilized.

In the case of the Photomatrix Scanner, an image processor receives 8 bit per pixel data ("P") and converts it to 1 bit per pixel data. The image processor converts pixels defined on a scale of 256 grey levels to pixels defined as either black (1) or white (0). Each image processor holds in registers three 8 bit threshold values: a low intensity threshold or dark level ("LTH"); a high intensity upper threshold or light level ("UTH"); and a processed video threshold ("PTH"). The image processor for a CCD evaluates each P value in two steps where it compares the pixel value to the three thresholds.

The first step is a course adjustment calculation which classifies P as black, white or as requiring further classification. If P is less than the LTH, P is output as black. If P is greater than the UTH, P is output as white. If P is between LTH and UTH then P needs further resolution (fine adjustment) and P is fed into a convolution filter for the image processor for further threshold processing which involves utilization of the PTH.

The convolution filter is a group of high-speed adders and multipliers that construct a two-dimensional 5-by-5 matrix of pixels with P as the center pixel. The convolution filter determines whether the pixel data is to be processed as white or black in this fine adjustment by employing additional parameters which comprise PTH and pixel priority values. A pixel's priority value determines the weight given the pixel's contribution to the fine adjustment determination. The pixel priority value is the actual output decision device that multiplexes the high, low and processed video choices. It determines their combined value to obtain a final decision and outputs that decision. The final binary data values, representing black or white pixels, are sent to a buffer-write module.

The threshold settings in the Photomatrix image processing module determine the levels at which the processed grey level (8 bits per pixel) image is converted to a binary bit per pixel) image. This process of converting from 8 bit pixels to 1 bit pixels is called binarization. The many combinations of the high, low and processed thresholds are grouped into 8 levels which provide a spectrum of binarization from the darker to the lighter. These 8 threshold settings operate in the same manner as the darkness control on a copy machine. The 8 threshold levels can be selected either from the operator's terminal or the host computer interface.

One of the unexpected benefits of the present invention is that there is no need to use or adjust these darkness controls. When the Photomatrix Scanner is calibrated in accordance with the present invention the 50% threshold setting has been found to give accurate, consistent results. This may be due to the fact that the present invention is printer independent. In the manual process, it is necessary to compare the original scanned sheet with the image of the sheet as printed on another sheet of paper. Obviously, the printed image depends on the printer being used and its capabilities. According to the present invention, the data obtained by the scanner is directly analyzed and is therefore much more accurate than the manual process. While the 50% setting has been discussed, any of the other settings may be calibrated to give such results.

The manual process to determine the LTH, UTH and PTH values is tedious, time-consuming and requires numerous subjective judgments by the operator. The following procedure is generally followed in manually determining these values for the Photomatrix Scanner.

LTH is determined by initially setting LTH=UTH=PTH=0, scanning a document and printing the image scanned. If the printed image is "all" white, 10 is added to LTH and UTH while keeping PTH=0. The scanner is set to the new values, the document is scanned and the image is printed. This process is continued until the document becomes "visible" in the printed image. The value of LTH at this point is the final LTH value and is recorded.

UTH is determined by initially setting LTH=UTH=255 and PTH=0, scanning a document and printing the image scanned. If the printed image is "all" black, 10 is subtracted from LTH and UTH while keeping PTH=0. The scanner is set to the new values, the document scanned and the image printed. This process is continued until the document becomes visible in the printed image. The value of UTH at this point is the final UTH value and is recorded.

PTH is determined by initially setting LTH to the final LTH value, UTH to the final UTH value and PTH=0, scanning a document and printing the image scanned. If the image is "too" light, 10 is added to PTH while keeping both LTH and UTH at their set values. This process is continued until the printed image becomes "too" dark, at which point the last two PTH values are averaged and the average value is the set PTH value and is recorded.

In the prior art, thresholds for each camera were determined by the tedious, complicated and lengthy manual process described above. The manual process depended upon many subjective judgments by the operator who had to be particularly trained to make what were hopefully consistent judgments. Obviously, judgments as to "all" white or black, a "visible" image and "too" light or dark can easily vary from scan to scan and operator to operator. In addition to a lack of uniformity between judgments by a single individual there was evident an even greater lack of uniformity among different operators and different scanners. Moreover, because the manual process can take upwards of eight hours per camera, sixteen hours for both cameras, it could not be practically performed on a daily basis. Using the present invention complete calibration of both camera can be accomplished in about fifteen minutes.

According to the present invention, a computer program running on a digital computer is used to carry out the procedure of setting the threshold values. All decisions relating to image evaluation are performed by a computer. The operator merely loads the automatic sheet feeder with a stack of calibration sheets and runs the program. When the program finishes the scanner is loaded with the computer determined final threshold values. The novel and non-obvious calibration sheets are critical to the practice of the present invention.

In a preferred embodiment of the present invention, a Photomatrix Document Scanner, manufactured by Photomatrix of Phoenix, Ariz., utilizing a Terminal Data Corporation DS-4100 Document Transport, communicates with a host SUN 3-280 computer, manufactured by Sun Microsystems Inc. of Mountain View, Calif. via a Small Computer Systems Interface for the transmission of images and via an RS-232 serial link for the transmission of commands.

As shown in FIG. 1, the scanner communicates with its maintenance terminal via an RS-232 serial connection with a first intervening switch 1, while the host computer communicates with a printer also via an RS-232 serial connection with a second intervening switch 2. The switches are joined with an RS-232 compatible link. Both switches ca be controlled by the host computer.

During normal scanning operation, switch 1 is set to the scanner maintenance terminal and switch 2 is set to the printer. While running the threshold setting program of the present invention, the host computer sets switch 2 to pass data to switch 1 and switch 1 to accept data from switch 2. During termination of the program the switches are reset to normal operating mode, with switch 1 reset to accept data from the scanner maintenance terminal and switch 2 reset to pass data to the printer.

The threshold determinative portion of the calibration sheet image should comprise lines at a forty-five degree angle to the path of the document through the scanner (i.e. the vertical direction). For a resolution of 150 dots per inch ("dpi") the lines are preferably spaced $\frac{1}{4}$ inch apart. A resolution of 150 dpi generally implies a resolution along the scan line (i.e., horizontal direction) of 150 pixels per inch and a resolution in the cross-scan (i.e., vertical direction) of 150 lines per inch. The lines should be the same color as the printing on the documents to be scanned and should have the thickness of 2 dots at whatever resolution is being used. The background should be the same color as the background of the document to be scanned. Images consisting of characters, figures, horizontal or vertical lines should be avoided. The count of the number of black dots on a scanned calibration sheet image is the criterion used to evaluate image quality. It is not necessary for the same calibration sheet to be reused, duplicate originals may be used.

Before the calibration method can be put into automatic mode an initial determination is made to determine the optimal dot counts of the calibration sheet being used to calibrate the scanners. Once determined, the optimal dot counts for a calibration sheet remain constant for all calibrations for all cameras and for all scanners used. Thereby, beneficially increasing the consistency of results across all cameras and scanners.

A scan tolerance dot count ("TDC") is determined experimentally by examining several scans of a particular calibration sheet, noting the variations in dot counts and choosing a TDC value large enough so that the results of a significant number of rescans fall within it. A maximum dot count ("MDC") for the calibration image is determined, it is based on the maximum possible dot count for the camera for the calibration scan image. A minimum dot count set equal to is zero is also used.

In the case of the Photomatrix Scanner it is necessary to determine the processed video target dot count ("PTDC"), the lower target dot count ("LTDC") and the upper target dot count ("UTDC") for the calibration sheet. The PTDC is used in the fine processing that occurs in the convolution filter. In accordance with the present invention, LTDC is set equal to TDC+1, while the UTDC is set equal to MDC−(TDC+1).

According to one embodiment the MDC is simply the area of the calibration sheet multiplied by the resolution of the scan squared. For example, if the scan area is 8.5 inches by 1 inches, TDC=200 and the resolution is 150 dots per inch, MDC=(8.5)×(11)×(150)×(150)=2,103,750, the UTDC=2,103,549 and the LTDC=201.

Another embodiment adjusts the calibration scan area in order to minimize image processing time and errors due to misalignment of the calibration sheet and take into account scanner resolution limitations. The height of the scan area is symmetrically reduced to minimize processing time. The width is symmetrically reduced to minimize errors caused by sheet misallignment. The number of dots expected to be counted are based on the outer limits of scanner resolution.

In this later embodiment the scan area is effectively a rectangle located in the center of the calibration sheet. The height of the rectangle has been reduced to about two and one third inches, while the width of the rectangle is about two inches less than the width of the calibration sheet. At a resolution of 150 dots per inch, the Photomatrix Document Scanner uses between 16 pixels to 1728 pixels per line and between 16 lines to 3000 lines per image. The number of pixels per line must be an even multiple of 16 pixels. The resolution of 150 dots per inch is considered accurate to within ±2 per cent.

Subtracting 160 pixels, about one inch from each side of the scan line, results in a calibration scan width of 1408 pixels. Reducing the number of calibration lines scanned to 358 lines reduced the processing time to under second per calibration image. The MDC is then $(1408) \times (358) \times (1+0.02)^2$ or about 524,428. Since TDC is still 201, UTDC=MDC+201=524,629 and LTDC=201.

As long as the threshold determinative portion of the calibration sheet remains the same, TDC, MDC, UTDC and LTDC values need not change.

PTDC is determined by experimentation. A set of calibration sheets are prepared, final LTH and UTH values are determined by the manual method set forth above. During determination of the final UTH and LTH values the PTH value is set to and maintained at a value equal to zero. The calibration sheets are scanned and re-scanned while the PTH is varied until the operators agree that the particular PTH setting is resulting in the best image. The PTDC is set to the dot count at that point. As with the UTDC and the LTDC, as long as the threshold determinative portion of the calibration sheet remains the same, the PTDC will remain constant.

Next an example of a preferred embodiment of the present invention which uses LTDC, UTDC and PTDC as determined above is described in further detail. For this example, in determining the final threshold values for the 50% level, we start with the following values: LTDC=201, UTDC=508344, PTDC=35,000 and TDC=200 dots.

In determining the final LTH, a bisection method is used to find a dot count that matches a count of LTDC. While a bisection method is currently used, any analytic methodology may be used to find the desired match. At each step of the bisection process the LTH and UTH values are set to the average of the bounding values for LTH. PTH remains set to zero. This corresponds to the appearance of an image from the "all" white state in the manual process.

For the first scan, LTH_1 is set equal to LTH(0)=0 plus LTH(255)=255 divided by two, that is:

$$LTH\_1 = UTH = (0 + 255) \div 2 \approx 127.$$

The calibration sheet is scanned and Scan 1 results in a black dot count ("L_B_D_C_1") of 26505. Since the difference between LTDC and L_B_D_C_1 is greater than the tolerance of 200 dots the procedure is repeated, but only after the LTH setting is adjusted again by the bisection method. LTH_2 is set equal to LTH(0) plus LTH_1 divided by 2, that is:

$$LTH\_2 = UTH = (0 + 127) \div 2 \approx 63.$$

A calibration sheet is scanned and Scan 2 results in L_B_D_C_2 = 662. Again 662 is not within the 200 dot tolerance of LTDC the process continues. The LTH is adjusted with LTH_3 set equal to LTH(0) plus LTH_2 divided by 2, that is:

$$LTH\_3 = UTH = (0 + 63) \div 2 \approx 31.$$

A calibration sheet is scanned and Scan 3 results in L_B_D_C_3 = 2. Since 2 is within the 200 dot tolerance of LTDC, a final LTH setting has been found and LTH FINAL is set equal to 31.

The UTH is determined in a similar manner. A bisection method is used to find to find a dot count that matches a count of UTDC. At each step of the bisection process the UTH and LTH values are set to the average of the bounding values for UTH, while PTH remains at zero. This corresponds to the appearance of an image from the "all" black state in the manual process.

For the first scan, UTH_1 is set equal to UTH(0) = 0 plus UTH(255) = 255 divided by two, that is:

$$UTH\_1 = LTH = (0 + 255) \div 2 \approx 127.$$

The calibration sheet is scanned and Scan 1 results in a black dot count ("U_B_D_C_1") of 26507. In a preferred embodiment of the present invention, the UTH_1 is immediately set equal to the results of the scan used to determine LTH_1, which values had been stored in the host computer's memory during the earlier scan. Since the difference between UTDC and U_B_D_C_1 is greater than the 200 dot tolerance the procedure is repeated, but only after the UTH setting is adjusted again by the bisection method. UTH_2 is set equal to UTH(255) plus UTH_1 divided by 2, that is:

$$UTH\_2 = LTH = (255 + 127) \div 2 \approx 191.$$

A calibration sheet is scanned and Scan 2 results in U_B_D_C_2 = 100,847. Again as 100,847 is not within the 200 dot tolerance of the UTDC the process continues. The UTH is adjusted with UTH_3 set equal to UTH(255) plus UTH_2 divided by 2, that is:

$$UTH\_3 = LTH = (255 + 191) \div 2 \approx 223.$$

A calibration sheet is scanned and Scan 3 results in U_B_D_C_3 = 508,316. Since 508,316 is within the 200 dot tolerance of UTDC, a final UTH setting has been found and UTH_FINAL is set equal to 223.

The PTH is determined by setting the scanner LTH = LTH_FINAL, UTH = UTH_FINAL and PTH = 0. Additionally, the final PTH value is not determined until two successive scans results in both a dot count within the 200 dot tolerance of PTDC as well as a threshold value falling within an acceptable difference from the previous threshold value. Ten has been used successfully as an acceptable threshold value difference. Other than the preceding, PTH is determined in the manner described above for LTH and UTH. A bisection method is used to find a dot count that matches a count of PTDC. At each step of the bisection process the PTH values are set to the average of the bounding values for PTH. This corresponds to the appearance of the "best" image in the manual process.

For the first scan, PTH_1 is set equal to PTH(0) = 0 plus PTH(255) = 255 divided by two, that is:

$$PTH\_1 = (0 + 255) \div 2 \approx 127.$$

The calibration sheet is scanned and Scan 1 results in a black dot count ("P_B_D_C_1") of 43,293. Since the difference between PTDC and P_B_D_C_1 is greater than the tolerance of 200 dots the procedure is repeated, but only after the PTH setting is adjusted again by the bisection method. PTH_2 is set equal to PTH(0) plus PTH_1 divided by 2, that is:

$$PTH\_2 = (0 + 127) \div 2 \approx 63.$$

A calibration sheet is scanned and Scan 2 results in P_B_D_C_2 = 37,510. Again as 37,510 is not within the 200 dot tolerance of the PTDC the process continues. The PTH is adjusted with PTH_3 set equal to PTH(0) plus PTH_2 divided by 2, that is:

$$PTH\_3 = (0 + 63) \div 2 \approx 31.$$

A calibration sheet is scanned and Scan 3 results in P_B_D_C_3 = 35,195. Since 35,195 is within the 200 dot tolerance of PTDC, a final PTH setting has been found and PTH_FINAL is set equal to 31. As noted above, by retaining values from earlier scans, for example, in determining LTH_FINAL, the procedure for determining UTH_FINAL starts with the knowledge of such retained values. In practice, after setting the threshold values using this method, applicants have found the 50% scanner level to be the only one necessary for accurate scanning.

In yet another preferred embodiment of the present invention, generally only one calibration scan is required for calibrating a camera. This embodiment uses the signal generated by the analog-to-digital convertors ("ADCs"). The ADCs convert the analog video signal from the CCDs to an 8-bit-per-pixel 256 grey scale digitized video signal. In normal operation the output of the ADCs will be sent to the image processor where the threshold settings determine the levels at which the processed grey scale image is converted to a binary, black and white scale. In this embodiment, the results of the ADCs' output for a complete scan are retained in memory, initial threshold values are utilized in processing the image from the ADCs' output, the dot count is determined and the threshold value adjusted according to the present invention. The adjusted threshold values are then utilized in processing the retained ADCs' output, the dot count is determined and the threshold value adjusted accordingly. A minor difference between this gray scale method and the earlier method is that the black and white concept of the gray scale pixel is the opposite of the black or white pixel. Therefore, the dot counts obtained by the gray scale image is in the reverse order of the black or white threshold dot counts. That is, where the maximum dot count is obtained when LTH=UTH=255 in the earlier method, with a gray scale image the maximum dot count is obtained when LTH=UTH=0. Hence, it can be seen that with just one scan of the calibration sheet, by retaining and using the original grey scale image the scanner camera can be calibrated.

The source code listing example, which follows, is an example of a preferred embodiment of the present invention, where by using the gray scale data only one calibration scan is required for calibrating a camera. In this embodiment, the host computer processes the stored results of the ADCs' scan by executing the compiled binary of the source code listing set forth below. The listing is written in C, has been run under Sun Unix 4.2 Release 4.1 on a Sun computer and has been successfully used in determining final LTH, UTH and PTH threshold values for a Photomatrix Document Scanner. This listing enables the host computer to determine the threshold settings for three levels of sensitivity, 10%, 50% and 80% for each camera. It also determines, by interpolation, the threshold settings for the other levels of sensitivity.

*********************************************

SOURCE CODE LISTING

Copyright © Educational Testing Service 1990

Description: Threshold adjustment for scanner.
The thresholding method is based on the grayscale
image to determine lth, uth, and pth. It is required
to scan two sheets, one for top camera and the other
for bottom camera.

****************************************************************
****************************************************************
*/

```
#include <stdio.h>
#include <sys/file.h>
#include <sys/stat.h>
#include <pixrect/pixrect_hs.h>
#include <sgtty.h>
#include <errno.h>
#include "gsscanner.h"
#include "gsgray.h"
#define TOP 2
#define BOT 1
#define WINDOW_WIDTH 1728
#define WINDOW_LENGTH  2608
#define HEIGHT_OFFSET 1125     /* big sheet 7.5 inches */
#define WIDTH_OFFSET (20 * 8)  /* chars, 160 pixels*/
/* total chars for that region is 505831 */
#define RT "rt"
#define LO "lo"
#define CR 0x0D
#define  PRT ("/dev/ttyb")
#define NUM_BYTE_STATES 256
#define MAX_BYTE_VAL 255
#define TH_CMD_LENGTH 11

FILE *infile,*outfile;
struct sgttyb sgttyb;
struct scanWDB scanWDB;
struct grayWDB grayWDB;
struct scanInfo scanInfo;
struct scanAction scanAction;
struct scanDiag scanDiag;
static char carriage_return[1] = { CR };
static unsigned char bw[256] = {
   0,  28,  57,  85,  94, 105, 113, 120, 128, 135, 142, 144, 146, 148, 150, 152,
 154, 156, 158, 160,   2, 164, 166, 168, 170, 171, 171, 172, 173, 173, 174, 175,
 175, 176, 177, 177,   8, 178, 179, 180, 180, 181, 182, 182, 183, 184, 184, 185,
 186, 186, 187, 187, 188, 189, 190, 190, 191, 191, 192, 193, 193, 194, 195, 195,
 196, 197, 197, 198, 198, 199, 199, 199, 200, 200, 200, 201, 201, 201, 202, 202,
 202, 203, 203, 203, 204, 204, 204, 205, 205, 205, 206, 206, 206, 207, 207, 207,
 208, 208, 208, 209, 209, 209, 210, 210, 210, 211, 211, 211, 212, 212, 212, 213,
 213, 213, 214, 214, 214, 215, 215, 215, 216, 216, 216, 217, 217, 217, 218, 218,
 218, 219, 219, 219, 220, 220, 220, 221, 221, 221, 222, 222, 222, 223, 223, 223,
```

```
224, 224, 224, 225, 225, 225, 226, 226, 226, 227, 228, 228, 228, 228, 229, 229,
229, 229, 230, 230, 230, 230, 231, 231, 231, 231, 232, 232, 232, 232, 233, 233,
233, 233, 234, 234, 234, 234, 235, 235, 235, 235, 236, 236, 236, 236, 237, 237,
237, 237, 238, 238, 238, 238, 239, 239, 239, 239, 240, 240, 240, 240, 241, 241,
241, 241, 242, 242, 242, 242, 243, 243, 243, 243, 244, 244, 244, 244, 245, 245,
245, 245, 246, 246, 246, 246, 247, 247, 247, 247, 248, 248, 248, 248, 249, 249,
249, 249, 250, 250, 250, 250, 251, 251, 251, 251, 252, 252, 252, 253, 254, 255
};

/* to view gray image:
   rasfilter8to1 -d <gimage.sun# > xxx
   showimage xxx
*/
extern int errno;
static int debug = 0;
static struct threshold_table
        { /* threshold_table */
            int lth_target_dots; /* input */
            int uth_target_dots; /* input */
            int pth_target_dots; /* input */
            int lth_final; /* final */
            int uth_final; /* final */
            int pth_final; /* final */
        } /* threshold_table */
        top_camera[8],bottom_camera[8];
int prt_fd;

main(argc, argv)
int argc;
char **argv;
{ /* main */
FILE *rasterfile;
colormap_t colormap;
struct pixrect *bpr, *tpr, *gpr;
static unsigned char red[256], green[256], blue[256];
char s[33], *bbuffer, *tbuffer, *gbuffer,errmsg[80],buf[10];
int fd=-1,i,done,gsize, bsize, tsize, cc, which;
   if (argc > 1)
     if (strcmp(argv[1],"-d") == 0)
       debug = 1;
     else
       if (strcmp(argv[1],"-dump") == 0)
         debug = 2;
   for (i = 0; i < 256; i++)
   { /* init colormap */
      red[i] = green[i] = blue[i] = bw[i];
   } /* init colormap */
   colormap.type = RMT_EQUAL_RGB;
   colormap.length = 256;
   colormap.map[0] = red;
   colormap.map[1] = green;
   colormap.map[2] = blue;
   which = TOP;
   done = 0;
   *errmsg = 0;
   if (!debug)
     if (system("startline") != 0)
     { /* startline failed */
        sprintf(errmsg,"THRESHOLD ERROR: system startline failed, errno =%d",
            errno);
        exit_prompt(fd,errmsg);
     } /* startline failed */
   if (check_input("\nStart Line OK (Y/N)?   ") == -1)
        exit_prompt(fd,NULL);
   init_files();
   printf("\nSCANNER THRESHOLD ADJUSTMENT BEGINS...\n");
   do { /* get top camera threshold first and then bottom camera */
      errno = 0;
      if (get_parms(which) == -1)
```

```
      exit_prompt(fd,NULL);
printf("OPENING SCANNER DEVICE...\n");
fd = open("/dev/ss0", O_RDONLY);
   if (fd == -1)
      { /* open failed */
        sprintf(errmsg,"open(/dev/ss0) errno=%d",errno);
        exit_prompt(fd,errmsg);
      } /* open failed */
if (ioctl(fd, SSGSWDB, &grayWDB) == -1)
      { /* set gs wdb failed */
        sprintf(errmsg,"ioctl[SSGSWDB] errno=%d",errno);
        exit_prompt(fd,errmsg);
} /* set gs wdb failed */
      if (ioctl(fd, SSETWDB, &scanWDB) == -1)
        { /* set wdb failed */
          sprintf(errmsg,"ioctl[SSETWDB] errno=%d",errno);
          exit_prompt(fd,errmsg);
} /* set wdb failed */
      printf("SCANNER DEVICE OPENED\n");
bsize = scanWDB.bottomWindow.width * scanWDB.bottomWindow.length / 8;
tsize = scanWDB.topWindow.width * scanWDB.topWindow.length / 8;
gsize = grayWDB.grayWindow.length * grayWDB.grayWindow.width;
if ((bbuffer = (char *) valloc(bsize)) == NULL)
      { /* valloc bsize failed */
        sprintf(errmsg,"valloc(bsize) errno=%d bsize=%d",errno,bsize);
        exit_prompt(fd,errmsg);
} /* valloc bsize failed */
   (void)bzero(bbuffer,bsize);
if ((tbuffer = (char *) valloc(tsize)) == NULL)
      { /* valloc tsize failed */
        sprintf(errmsg,"valloc(tsize) errno=%d tsize=%d",errno,tsize);
        exit_prompt(fd,errmsg);
} /* valloc tsize failed */
   (void)bzero(tbuffer,tsize);
if ((gbuffer = (char *) valloc(gsize)) == NULL)
      { /* valloc gsize failed */
        sprintf(errmsg,"valloc(gsize) errno=%d gsize=%d",errno,gsize);
        exit_prompt(fd,errmsg);
} /* valloc gsize failed */
   (void)bzero(gbuffer,gsize);

if (which == TOP)
      { /* top */
        printf("ADJUST TOP CAMERA...FEED ONE SHEET NOW! \n");
        if (scanner_display(fd,"ADJUST TOP ") == -1)
           break;
      } /* top */
   else
      { /* bottom */
        printf("ADJUST BOTTOM CAMERA...FEED ONE SHEET NOW!\n");
        if (scanner_display(fd,"ADJUST BOTTOM ") == -1)
           break;
      } /* bottom */
if ((cc = read(fd, bbuffer, bsize)) == -1)
      { /* read bbuffer failed */
        sprintf(errmsg,"read(fd,bbuffer,bsize) errno=%d fd=%d,bsize=%d",
                errno,fd,bsize);
        exit_prompt(fd,errmsg);
      } /* read bbuffer failed */
if ((cc = read(fd, tbuffer, tsize)) == -1)
      { /* read tbuffer failed */
        sprintf(errmsg,"read(fd,tbuffer,tsize) errno=%d fd=%d,tsize=%d",
                errno,fd,tsize);
        exit_prompt(fd,errmsg);
} /* read tbuffer failed */
if ((cc = read(fd, gbuffer, gsize)) == -1)
      { /* read gbuffer failed */
        sprintf(errmsg,"read(fd,gbuffer,gsize) errno=%d fd=%d,gsize=%d",
                errno,fd,gsize);
```

```
            exit_prompt(fd,errmsg);
    } /* read gbuffer failed */
    if (cc == 0)
       { /* check file close */
         if (ioctl(fd, SGETACT, &scanAction) == -1)
            { /* sgetact failed */
              sprintf(errmsg,"ioctl(SGETACT) errno=%d",errno);
              exit_prompt(fd,errmsg);
            } /* sgetact failed */
         if (scanAction.lights & FiCloseSwitch)
            { /* end of file */
              printf(
         "THRESHOLD ADJUSTMENT STOPS DUE TO SCANNER FILE CLOSE KEYPRESS\n");
              break;
            } /* end of file */
       } /* check file close */
       else
       { /* get threshold values */
         determine_threshold(gbuffer,grayWDB.grayWindow.width,
                                     grayWDB.grayWindow.length,
                                     which,fd);
         display_current_status();
         if (debug == 2)
            { /* debug is on */
              *buf = 0;
              if (which == BOT)
                strcpy(buf,"BOT");
              else
                strcpy(buf,"TOP");
              bpr = mem_point(scanWDB.bottomWindow.width,
                              scanWDB.bottomWindow.length,
                              1, (short *) bbuffer);
              rasterfile = fopen(sprintf(s, "bimage.sun%s", buf), "w");
              printf("Debug mode is on, dumping image to (%s)...\n",s);
              pr_dump(bpr, rasterfile, 0, RT_STANDARD, 0);
              fclose(rasterfile);
              pr_destroy(bpr);
              tpr = mem_point(scanWDB.topWindow.width,
                              scanWDB.topWindow.length,
                              1, (short *) tbuffer);
              rasterfile = fopen(sprintf(s, "timage.sun%s", buf), "w");
              printf("Debug mode is on, dumping image to (%s)...\n",s);
              pr_dump(tpr, rasterfile, 0, RT_STANDARD, 0);
              fclose(rasterfile);
              pr_destroy(tpr);
              gpr = mem_point(grayWDB.grayWindow.width,
                              grayWDB.grayWindow.length,
                              8, (short *) gbuffer);
              rasterfile = fopen(sprintf(s, "gimage.sun%s", buf), "w");
              printf("Debug mode is on, dumping image to (%s)...\n",s);
              pr_dump(gpr, rasterfile, &colormap, RT_STANDARD, 0);
              fclose(rasterfile);
              pr_destroy(gpr);
            } /* debug is on */
       } /* get threshold values */
       if (which == BOT)
          { /* done */
            scanner_display(fd,"THRESHOLD DONE");
            done = 1;
          } /* done */
          else
            which = BOT;
    free(bbuffer);
    free(tbuffer);
    free(gbuffer);
    close(fd);
    fd = -1;
    } while (!done);
    if (fclose(outfile) != 0)
    { /* failed */
      sprintf(errmsg,"fclose(outfile) failed. errno=%d\n",errno);
```

```c
            exit_prompt(fd,errmsg);
        } /* failed */
        printf("NEW THRESHOLD VALUES ARE SHOWN IN THE ABOVE TABLE.\n");
        if (check_input(
            "\nSET NEW THRESHOLD VALUES TO SCANNER (Y/N)?   ")
            == 0)
        { /* set new pth */
            rename("dynamic_Threshold.output", "dynamic_Threshold.bak");
            if (rename("dynamic_Threshold.output.tmp","dynamic_Threshold.output")
                == -1)
            { /* failed */
                sprintf(errmsg,"rename output file failed. errno=%d\n",errno);
                exit_prompt(fd,errmsg);
            } /* failed */
            chmod("dynamic_Threshold.output",0777);
            if (check_input("LINK SET UP TO SCANNER? (Y/N)   ") == -1)
            { /* switch not ok */
                exit_prompt(fd,"LINK IS NOT SET UP!");
            } /* switch not ok */
            init_RS232C();
            reset_scanner();
            if (set_scanner_threshold("dynamic_Threshold.output") == -1)
                printf("THRESHOLD ERROR: Can't set scanner threshold values\n");
            else
                printf("\nSCANNER PROCESSED THRESHOLD VALUES INITIALIZED.\n");
            reset_scanner();
            close(prt_fd);
            printf("RESUME SWITCH BOX SETUP TO PRINTER, READY(Y/N)? ");
            scanf("%s",errmsg);
        } /* set new pth */
        printf("\nSCANNER THRESHOLD ADJUSTMENT ENDS.\n");
        exit_prompt(fd,NULL);
} /* main */ int
determine_threshold(buff,line_chars,lines,which,scanfd)
unsigned char *buff;
int line_chars,lines,which,scanfd;
{ /* get_total_black_dots */
char msg[80];
int i,chars,loop,sum,round_up;
unsigned char *bufptr;
int top_start,bot_stop,left_start,right_stop;
int hist[NUM_BYTE_STATES],hist2[NUM_BYTE_STATES];
unsigned char map[NUM_BYTE_STATES];
int uth,uth_count,lth,lth_count,pth_10,pth_50,pth_80,
    pth_count10,pth_count50,pth_count80,thr[8];
    /* for big sheet  11x17 */
    top_start = HEIGHT_OFFSET;
    bot_stop = HEIGHT_OFFSET;
    left_start = WIDTH_OFFSET;
    right_stop = WIDTH_OFFSET;
    for (loop=0;loop<NUM_BYTE_STATES;loop++)
        hist2[loop] = hist[loop] = 0;
    for (i=(top_start-1);i<(lines - bot_stop);i++)
    { /* search area is 7.5 inches less ( 1125 pixels)
            from top and bottom edges */
        bufptr = &buff[i*line_chars];
        bufptr+=left_start;
        for (chars=left_start;chars <= (line_chars - right_stop);
            chars++)
        { /* search area is 20 chars less (160 pixels)
                from left and right edges */ hist[*bufptr] += 1;
            bufptr++;  /* get next char */
        } /* search area is 20 chars less (160 pixels)
                from left and right edges */
    } /* search area is 7.5 inches less (1125 pixels)
```

```
                from top and bottom edges */
    if (which == TOP)
    { /* get top dot counts */
        lth_count = top_camera[0].lth_target_dots;
        uth_count = top_camera[0].uth_target_dots;
        pth_count10 = top_camera[0].pth_target_dots;
        pth_count50 = top_camera[4].pth_target_dots;
        pth_count80 = top_camera[7].pth_target_dots;
    } /* get top dot counts */
    else
    { /* get bottom dot counts */
        lth_count = bottom_camera[0].lth_target_dots;
        uth_count = bottom_camera[0].uth_target_dots;
        pth_count10 = bottom_camera[0].pth_target_dots;
        pth_count50 = bottom_camera[4].pth_target_dots;
        pth_count80 = bottom_camera[7].pth_target_dots;
    } /* get bottom dot counts */
    if (debug)
    { /* see value */
        if (which == TOP)
          printf("TOP input dot counts:lth=%d,uth=%d,pth10=%d,pth50=%d,pth80=%d\n",
            lth_count,uth_count,pth_count10,pth_count50,pth_count80);
        else
            printf("BOTTOM input dot counts:lth=%d,uth=%d,pth10=%d,pth50=%d,pth80=%d\n",
            lth_count,uth_count,pth_count10,pth_count50,pth_count80);
    } /* see value */
    lth = uth = 0;
    sum = 0;
    for (loop = 0; loop < NUM_BYTE_STATES; loop++)
    { /* get lth and uth */
        sum += hist[loop];
        if (sum <= uth_count)
          uth++;
        if (sum <= lth_count)
          lth++;
        else
        break;
    } /* get lth and uth */
    if (lth == uth)
    { /* bad value */
        *msg = 0;
        if (which == TOP)
          sprintf(msg,"Invalid TOP lth (%d) and uth (%d)",lth, uth);
        else
          sprintf(msg,"Invalid BOTTOM lth (%d) and uth (%d)",lth, uth);
        exit_prompt(scanfd,msg);
    } /* bad value */
    round_up = lth-uth;
    for (loop = 0; loop < NUM_BYTE_STATES; loop++)
    { /* build map - scale [lth, uth] to [0, 255] */
        if (loop <= uth)
        { /* black */
            map[loop] = 0;
            if (loop == uth)
              map[loop] = 1;
        } /* black */
        else
        if (loop < lth)
        { /* round up */
            if ((2*MAX_BYTE_VAL*(loop-uth)+1) >= round_up)
              map[loop] = (2*MAX_BYTE_VAL*(loop-uth)+1)/(2*(lth-uth)) + 1;
            else
              map[loop] = (2*MAX_BYTE_VAL*(loop-uth)+1)/(2*(lth-uth));
        } /* round up */
        else
            map[loop] = MAX_BYTE_VAL; /* white */
    } /* build map */
```

```
for (loop=0;loop<NUM_BYTE_STATES;loop++)
  hist2[map[loop]] += hist[loop];
if (debug)
{
    if (which == TOP)
      printf("TOP window : \n");
    else
      printf("BOTTOM window : \n");
    for (loop=0;loop<NUM_BYTE_STATES;loop++)
    {
        printf("hist2[%d]=%d  ",loop,hist2[loop]);
        if ((loop %4 )== 0)
        printf("\n");
    }
    printf("\n");
    for (loop=0;loop<NUM_BYTE_STATES;loop++)
    {
        printf("map[%d]=%d ",loop,map[loop]);
        if ((loop %4 )== 0)
           printf("\n");
    }
    printf("\n");
    sum = 0;
    for (loop=0;loop<NUM_BYTE_STATES;loop++)
    {
        sum += hist[loop];

if (loop == 0x3f)
          printf("\n0x3f sum = %d\n",sum);
        if (loop == 0xbf)
           printf("\n0xbf sum = %d\n",sum);
        printf("hist[%d]=%d ",loop,hist[loop]);
        if ((loop %4 )== 0)
           printf("\n");
    }
    printf("\n");
}
pth_10 =  pth_50 = pth_80 = 0;
sum = 0;
for (loop = 0; loop < NUM_BYTE_STATES; loop++)
{ /* get pth_80 */
    sum += hist2[loop];
    if (sum < pth_count80)
      pth_80++;
    if (sum < pth_count50)
      pth_50++;
    if (sum < pth_count10)
      pth_10++;
    else
      break;
} /* get pth_80 */
if ( (pth_10 == pth_50) || (pth_50 == pth_80) )
{ /* bad value */
   *msg = 0;
   if (which == TOP)
      sprintf(msg,"Invalid TOP pth_10 (%d) pth_50 (%d) pth_80 (%d)",
                  pth_10,pth_50,pth_80);
   else
      sprintf(msg,"Invalid BOTTOM pth_10 (%d) pth_50 (%d) pth_80 (%d)",
                  pth_10,pth_50,pth_80);
   exit_prompt(scanfd,msg);
} /* bad value */
if (which == TOP)
{ /* set top camera threshold */
   for (i=0;i<=7;i++)
   { /* set lth, uth */
      top_camera[i].lth_final = MAX_BYTE_VAL - lth;
      top_camera[i].uth_final = MAX_BYTE_VAL - uth;
   } /* set lth, uth */
```

```
      thr[0] = MAX_BYTE_VAL - pth_10;
      thr[4] = MAX_BYTE_VAL - pth_50;
      thr[7] = MAX_BYTE_VAL - pth_80;
      scaling_threshold(thr);
      for (i=0;i<=7;i++)
         top_camera[i].pth_final = thr[i];
   } /* set top camera threshold */
   else
   { /* set bottom camera threshold */
      for (i=0;i<=7;i++)
      { /* set lth, uth */
         bottom_camera[i].lth_final = MAX_BYTE_VAL - lth;
         bottom_camera[i].uth_final = MAX_BYTE_VAL - uth;
      } /* set lth, uth */
      thr[0] = MAX_BYTE_VAL - pth_10;
      thr[4] = MAX_BYTE_VAL - pth_50;
      thr[7] = MAX_BYTE_VAL - pth_80;
      scaling_threshold(thr);
      for (i=0;i<=7;i++)
         bottom_camera[i].pth_final = thr[i];
   } /* set bottom camera threshold */
   setup_outfile(which);
   return 0;
} /* determine_threshold */ int
setup_outfile(which)
int which;
/* setup dynamic_threshold.output */
{ /* setup_outfile */
   static char pcmd[50],ucmd[50],lcmd[50];
   int i;
   *pcmd = *ucmd = *lcmd = 0;
   if (which == BOT)
   {
      strcpy(pcmd,"pth 1 %x %d\n");
      strcpy(ucmd,"uth 1 %x %d\n");
      strcpy(lcmd,"lth 1 %x %d\n");
      for (i=0;i<8;i++)
         fprintf(outfile,lcmd,bottom_camera[i].lth_final,i+1);
      for (i=0;i<8;i++)
         fprintf(outfile,ucmd,bottom_camera[i].uth_final,i+1);
      for (i=0;i<8;i++)
         fprintf(outfile,pcmd,bottom_camera[i].pth_final,i+1);
   }
   else
   {
      strcpy(pcmd,"pth 2 %x %d\n");
      strcpy(ucmd,"uth 2 %x %d\n");
      strcpy(lcmd,"lth 2 %x %d\n");
      for (i=0;i<8;i++)
         fprintf(outfile,lcmd,top_camera[i].lth_final,i+1);
      for (i=0;i<8;i++)
         fprintf(outfile,ucmd,top_camera[i].uth_final,i+1);
      for (i=0;i<8;i++)
         fprintf(outfile,pcmd,top_camera[i].pth_final,i+1);
   }
   return 0;
} /* setup_outfile */ int
scaling_threshold(th)
int th[8];
{ /* scaling_threshold */
   int t,r,i;
   t = (th[4]-th[0])/4;
   r = (th[4]-th[0])%4;
   for (i=1;i<=3;i++)
      th[i] = th[i-1]+t;
```

```
      if (r > 0)
      { /* average residual to rest */
         for (i=3;i>0;i--)
         {
            th[i] += 1;
            r--;
            if (r == 0)
               break;
         }
      }
      t = (th[7] - th[4])/3;
      r = (th[7] - th[4])%3;
      for (i=5;i<7;i++)
         th[i] = th[i-1]+t;
      if (r > 0)
      { /* average residual to rest */
         for (i=6;i>4;i--)
         {
            th[i] += 1;
            r--;
            if (r == 0)
               break;
         }
      }
      return 0;
} /* scaling_threshold */ int
init_files()
/*
in gray scale image, total black is 0x00, total white is 0xff.
bits of a pixel represent the amount of light per pixel (8 bits)
was caught.
the black and white concept of G/S pixel is opposite to B/W pixel.
thus, the dots counts in the input file is in a reverse order of
the old B/W threshold input file.
*/
{ /* init_files */
   int i,
   bot_pblack10=0,bot_pblack50=0,bot_pblack80=0,  /* pth target dot counts */
   top_pblack10=0,top_pblack50=0,top_pblack80=0,  /* pth target dot counts */
   bot_lblack10=0,bot_lblack50=0,bot_lblack80=0,  /* lth target dot counts */
   top_lblack10=0,top_lblack50=0,top_lblack80=0,  /* lth target dot counts */
   bot_ublack10=0,bot_ublack50=0,bot_ublack80=0,  /* uth target dot counts */
   top_ublack10=0,top_ublack50=0,top_ublack80=0;  /* uth target dot counts */
   errno = 0;
   for (i=0;i<8;i++)
   { /* init struct */
         bottom_camera[i].lth_final = 0xffff;
         bottom_camera[i].uth_final = 0xffff;
         bottom_camera[i].pth_final = 0xffff;
         top_camera[i].lth_final = 0xffff;
         top_camera[i].uth_final = 0xffff;
         top_camera[i].pth_final = 0xffff;
   } /* init struct */
   infile = fopen("Threshold_adjustment.input","r");
   outfile = fopen("dynamic_Threshold.output.tmp","w");
   if ((infile == NULL) || (outfile == NULL))
   { /* file error */
      printf("Threshold Adjustment: Files can not open, errno=%d\n",
             errno);
      exit_prompt(-1,NULL);
   } /* file error */
   fscanf(infile,"%d %d %d",&bot_pblack10,&bot_pblack50,&bot_pblack80);
   fscanf(infile,"%d %d %d",&top_pblack10,&top_pblack50,&top_pblack80);
   fscanf(infile,"%d %d %d",&bot_lblack10,&bot_lblack50,&bot_lblack80);
   fscanf(infile,"%d %d %d",&top_lblack10,&top_lblack50,&top_lblack80);
   fscanf(infile,"%d %d %d",&bot_ublack10,&bot_ublack50,&bot_ublack80);
   fscanf(infile,"%d %d %d",&top_ublack10,&top_ublack50,&top_ublack80);
```

```
  fclose(infile);
  if ((bot_pblack10 < 0) && (bot_pblack50 < 0) && (bot_pblack80 < 0)
      && (top_pblack10 < 0) && (top_pblack50 < 0) && (top_pblack80 < 0))
  { /* input dots error */
     printf("Threshold Adjustment: Threshold_adjustment.input BAD NUMBERS\n")
     exit_prompt(-1,NULL);
  } /* input dots error */
  if ((bot_lblack10 < 0) && (bot_lblack50 < 0) && (bot_lblack80 < 0)
      && (top_lblack10 < 0) && (top_lblack50 < 0) && (top_lblack80 < 0))
  { /* input dots error */
     printf("Threshold Adjustment: Threshold_adjustment.input BAD NUMBERS\n")
     exit_prompt(-1,NULL);
  } /* input dots error */
  if ((bot_ublack10 < 0) && (bot_ublack50 < 0) && (bot_ublack80 < 0)
      && (top_ublack10 < 0) && (top_ublack50 < 0) && (top_ublack80 < 0))
  { /* input dots error */
     printf("Threshold Adjustment: Threshold_adjustment.input BAD NUMBERS\n")
     exit_prompt(-1,NULL);
  } /* input dots error */ top_camera[0].lth_target_dots = top_lblack10;
  top_camera[0].uth_target_dots = top_ublack10;
  top_camera[0].pth_target_dots = top_pblack10;
  top_camera[4].lth_target_dots = top_lblack50;
  top_camera[4].uth_target_dots = top_ublack50;
  top_camera[4].pth_target_dots = top_pblack50;
  top_camera[7].lth_target_dots = top_lblack80;
  top_camera[7].uth_target_dots = top_ublack80;
  top_camera[7].pth_target_dots = top_pblack80;

bottom_camera[0].lth_target_dots = bot_lblack10;
  bottom_camera[0].uth_target_dots = bot_ublack10;
  bottom_camera[0].pth_target_dots = bot_pblack10;
  bottom_camera[4].lth_target_dots = bot_lblack50;
  bottom_camera[4].uth_target_dots = bot_ublack50;
  bottom_camera[4].pth_target_dots = bot_pblack50;
  bottom_camera[7].lth_target_dots = bot_lblack80;
  bottom_camera[7].uth_target_dots = bot_ublack80;
  bottom_camera[7].pth_target_dots = bot_pblack80;
  return 0;
} /* init_files */ int
check_input(display_text)
char *display_text;
{   /* check_input */
    char input_msg[10];
    int done_input = 0;
    do { /* display and check input */
        printf(display_text);
        scanf("%s",input_msg);
        if ((strcmp(input_msg,"n") == 0) || (strcmp(input_msg,"N") == 0))
           break;
        if ((strcmp(input_msg,"y") == 0) || (strcmp(input_msg,"Y") == 0))
           done_input = 1;
    } while (!done_input);
    if (done_input == 1)
        return 0;
    else
        return -1;
} /* check_input */ int
scanner_display(scanfd,text)
int scanfd;
char *text;
{ /* scanner_display */
    if (scanfd == -1)
    { /* closed */
```

```
      printf("scanner_display, scanner closed\n");
      return -1;
   } /* closed */
   if (ioctl(scanfd,SGETACT,&scanAction)== -1)
   { /* unable to get current action values */
      printf("scanner SGETACT error\n");
      return -1;
   } /* unable to get current action values */
   strcpy(scanAction.message,text);
   if (ioctl(scanfd,SSETACT,&scanAction)== -1)
   { /* unable to set current action values */
      printf("scanner SSETACT error\n");
      return -1;
   } /* unable to set current action values */
} /* scanner_display */ int
exit_prompt(scanfd,errmsg)
int scanfd;
char *errmsg;
/* exit will cleanup all the buffers */
{ /* prompt error and exit */
   char msg[5];
   if (scanfd != -1)
      close(scanfd);
   if (errmsg != NULL)
      printf("Threshold Adjustment error: (%s)\n",errmsg);
   printf("PRESS X AND Return TO EXIT... ");
   scanf("%s",msg);
   exit(0);
}  /* prompt error and exit */ int get_parms(which)
int which;
{ /* get_parms */
      int fd, err;
      FILE *stpixline;
      int botstartline,topstartline;
      stpixline = fopen("dynamic_startLine.file","r");
      if (stpixline == NULL)
      { /* unable to open start file */
         printf(
            "CAN NOT OPEN dynamic_startLine.file. (Did you run startline
YET?");
         return -1;
      } /* unable to open start file */
      fscanf(stpixline,"%d %d", &topstartline,&botstartline);
      if (fclose(stpixline) != 0)
      { /* fclose failed */
         printf("fclose stpixline failed. errno=%d\n",errno);
         return -1;
      } /* fclose failed */
   scanWDB.flags = DocInvertWDB | UseBackSide | RotateFrontSide;
   scanWDB.xDPI = 150;
   scanWDB.yDPI = 150;

scanWDB.topThreshold = 5;
   scanWDB.topWindow.startPixel = 0;
   scanWDB.topWindow.startLine = topstartline;
      scanWDB.topWindow.length = WINDOW_LENGTH;
      scanWDB.topWindow.width = WINDOW_WIDTH;
      scanWDB.topWindow.topMask = 0;
      scanWDB.topWindow.bottomMask = 0;
      scanWDB.topWindow.leftMask = 0;
      scanWDB.topWindow.rightMask = 0;

scanWDB.bottomThreshold = 5;
      scanWDB.bottomWindow.startPixel = 0;
   scanWDB.bottomWindow.startLine = botstartline;
```

```
        scanWDB.bottomWindow.length = WINDOW_LENGTH ;
        scanWDB.bottomWindow.width = WINDOW_WIDTH;
        scanWDB.bottomWindow.topMask = 0;
        scanWDB.bottomWindow.bottomMask = 0;
        scanWDB.bottomWindow.leftMask = 0;
        scanWDB.bottomWindow.rightMask = 0;

grayWDB.grayWindow.startPixel = 0;
        grayWDB.grayWindow.length = WINDOW_LENGTH;
        grayWDB.grayWindow.width = WINDOW_WIDTH;
        if (which == TOP)
           { /* get gray image from top camera */
             grayWDB.side = GS_GRAY_ON_UP_SIDE;
               grayWDB.grayWindow.startLine = scanWDB.topWindow.startLine;
         } /* get gray image from top camera */
             else
             { /* get gray image from bottom camera */
                 grayWDB.side = GS_GRAY_ON_DOWN_SIDE;
                 grayWDB.grayWindow.startLine = scanWDB.bottomWindow.startLine;
             } /* get gray image from bottom camera */
} /* get_parms */ int
init_RS232C()
/* open ttyb and set tty to RAW mode */
{ /* init_RS232C */
    errno = 0;
    if ((prt_fd = open(PRT, O_RDWR)) == -1)
    { /* can't open ttyb */
      printf("open ttyb failed, errno = %d\n",errno);
      exit_prompt(-1,NULL);
    } /* can't open ttyb */
    (void)set_RAW_mode();
} /* init_RS232C */ int
close_RS232C()
/* close ttyb line to scanner */
{ /* close_RS232C */
    close(prt_fd);
} /* close_RS232C */
int
reset_scanner()
{ /* reset_scanner */
   init_RS232C();
   printf("\nRESETTING SCANNER... \n");
   if (issue_scanner_command(RT) == -1)
      exit_prompt(-1,NULL);
   sleep(6);
   printf("\nRESET SCANNER DONE.\n");
} /* reset_scanner */ int
set_RAW_mode()
{ /* set_RAW_mode */
   if (ioctl(prt_fd, TIOCGETP, &sgttyb) == -1)
     { /* get sgttyb failed */
       printf("TIOCGETP failed. errno=%d\n",errno);
       exit_prompt(-1,NULL);
     } /* get sgttyb failed */
   sgttyb.sg_flags &= ~ECHO;
   sgttyb.sg_flags &= ~CRMOD;
   sgttyb.sg_flags &= ~CBREAK;
   sgttyb.sg_flags |= RAW;
   sgttyb.sg_flags |= CRDELAY;
   sgttyb.sg_flags &= ~ODDP;
   sgttyb.sg_flags &= ~EVENP;
   if (ioctl(prt_fd, TIOCSETP, &sgttyb) == -1)
```

```
        { /* set sgttyb failed */
            printf("TIOCSETP failed. errno=%d\n",errno);
            exit_prompt(-1,NULL);
        } /* set sgttyb failed */
    } /* set_RAW_mode */ int
flush_IO()
/* flush data in xmit and rcv fifo */
{ /* flush_IO */
    int arg=0;
    if (ioctl(prt_fd,TIOCFLUSH,&arg) == -1)
        { /* can't flush */
        printf("TIOCFLUSH failed. errno=%d \n",errno);
        exit_prompt(-1,NULL);
    } /* can't flush */
} /* flush_IO */ int
issue_scanner_command(cmd)
char *cmd;
{ /* issue_scanner_command */
    int rchar=0,lword=0,count=0,retry = 0,
        done=0,dot_count=0,cc=0;
    char buf[1],msg[50];
    do { /* retry loop */
    strcpy(msg,"");
    (void)flush_IO();
    strcpy(buf,"");
    lword = LPASS8; /* pass exactly 8 bits as input, do't care mode */
if (ioctl(prt_fd, TIOCLBIS, &lword) == -1)
{ /* set local mode failed */
    printf("TIOCLBIS failed\n");
    return -1;
} /* set local mode failed */ if (write(prt_fd,cmd,strlen(cmd)) < 0)
    printf("errno = %d\n",errno);
if (debug)
  printf("\nCOMMAND ISSUED= %s\n",cmd);
else
  printf("\nSCANNER COMMAND ISSUED... \n");
if (strcmp(cmd,carriage_return) != 0)
    if (write(prt_fd,carriage_return,1) <0)
    printf("errno = %d\n",errno);
count = 0;
do { /* read response */ if (ioctl(prt_fd, FIONREAD, &rchar) == -1)
        { /* read # input data failed */
        printf("FIONREAD failed \n");
        return -1;
    } /* read # input data failed */
    else
        if (rchar > 0)
        { /* incoming data */
            do { /* read data */
                cc = read(prt_fd,buf,1);
                if (debug)
                    printf("%c",buf[0]);
                if (buf[0] != '.')
                {
                    dot_count = 0;
                }
                if ((buf[0] == '?' || buf[0] == '>'))
                    done = 1;
                else
                    if (buf[0] == '.')
                        dot_count++;
```

```c
                if (dot_count == 3)
                    done = 1;
            } while (done == 0); /* read data */
        } /* incoming data */
        if (done == 0)
        {
            printf("WAITING SCANNER RESPONSE...\n");
            sleep(1);
        }
        count++;
    } while ((count < 5) && (done == 0)); /* read response */
    if (done && !debug)
       printf("SCANNER RESPONSE RECEIVED.\n");
    (void)flush_IO();
    if ((count == 5) && (done == 0) && (retry < 3))
    { /* link error */
        printf("\nLINK ERROR, CHECK LINK TO SCANNER... \n");
        printf("LINK OK? (Y/N) ");
        scanf("%s",msg);
        if ((strcmp(msg,"n") == 0) || (strcmp(msg,"N") == 0))
        { /* switch not ok */
            printf("\nTHRESHOLD ABORTS AS PER OPERATOR'S REQUEST.\n");
            return -1;
        } /* switch not ok */
    } /* link error */
    retry++;
  } while ((retry <= 3) && (done == 0));
  if (done)
     return 0;

printf("\nBAD DATA LINK, THRESHOLD ABORTS!!!\n");
  return -1;
} /* issue_scanner_command */ int
build_and_issue_command(type,wdb,pth,thr)
char *type; /* "pth","lth","uth" */
int  wdb,pth,thr;
{ /* build_and_issue_command */
   static char cmd[10];
   static char command[100];
   strcpy(cmd,"");
   strcpy(command,"");
   strcpy(command,type);
   if ((wdb > 2) || (wdb < 1))
   { /* check camera */
     printf("UNKNOWN CAMERA: %d\n",wdb);
     return -1;
   } /* check camera */
   (void)sprintf(cmd," %1u",wdb);
   strcat(command,cmd);
   strcat(command," ");
   strcpy(cmd,"");
   if ((pth > 0xff) || (pth < 0x00))
   { /* check pth value */
      printf("INVALID pth threshold value: %x\n",pth);
      return -1;
   } /* check pth value */
   (void)sprintf(cmd,"%x",pth);
   strcat(command,cmd);
   strcat(command," ");
   strcpy(cmd,"");
   if ((thr > 8) || (thr < 1))
   { /* check threshold level */
      printf("INVALID threshold: %d\n",thr);
      return -1;
   } /* check threshold level */
   (void)sprintf(cmd,"%1u",thr);
   strcat(command,cmd);
```

```
  if (issue_scanner_command(command) == -1)
    return -1;
  return 0;
} /* build_and_issue_command */ int
set_scanner_threshold(init_file_name)
char *init_file_name;
{ /* set_scanner_threshold */
   FILE *init_file;
   char input_cmd[12]; /* include CR and NULL */
   int  cmd_length;
   init_file = fopen(init_file_name,"r");
   if (init_file == NULL)
   { /* can't open file */
      printf("Can't open %s, errno=%d\n",init_file_name,errno);
      return -1;
   } /* can't open file */
   debug = 1;
   if (issue_scanner_command("lo") == -1)
   { /* can't issue command */
      printf("Can't Issue lo command\n");
      return -1;
   } /* can't issue command */
   strcpy(input_cmd,"");
   while (fgets(input_cmd, sizeof (input_cmd), init_file) != NULL)
   { /* read command from init_file */
       cmd_length = strlen(input_cmd);
       if ((cmd_length > TH_CMD_LENGTH) ||
           (cmd_length < (TH_CMD_LENGTH - 1)))
       { /* bad length */
         if (cmd_length > 1)
         { /* not CR */
            printf("BAD command: %s",input_cmd);
            return -1;
         } /* not CR */
       } /* bad length */
       else
       { /* command ok */
           input_cmd[cmd_length-1] = 0x00; /* strip off CR */
           if (issue_scanner_command(input_cmd) == -1)
           { /* can't issue command */
              printf("Can't Issue init command\n");
              return -1;
           } /* can't issue command */
       } /* command ok */
   } /* read command from init_file */
   fclose(init_file);
   if (issue_scanner_command("lf") == -1)
   { /* can't issue command */
       printf("Can't Issue lf command\n");
       return -1;
   } /* can't issue command */
   debug = 0;
   return 0;
} /* set_scanner_threshold */ int
display_current_status()
{ /* display_current_status */
   int i;
   printf("\n");
   printf("          ---------- THRESHOLD ADJUSTMENT STATUS ---------- \n");
   printf("                                                            \n");
   printf("           BOTTOM CAMERA               TOP    CAMERA        \n");
```

```
printf("         lth    uth    pth             lth    uth    pth         \n");
for (i=0;i<8;i++)
    printf(" %d0%%    %4x    %4x    %4x         %4x    %4x    %4x        \n",
        i+1, bottom_camera[i].lth_final,bottom_camera[i].uth_final,
        bottom_camera[i].pth_final,
        top_camera[i].lth_final,top_camera[i].uth_final,
        top_camera[i].pth_final );
printf("        -------------------------------------------------------- \n");
} /* display_current_status */
```

****************************************

Although several embodiments of the present invention have been described, it is desired to emphasize that this has been for the purpose of illustrating and describing the invention, and should not be considered as necessarily limitative of the invention, it being understood that many modifications can be made by those skilled in the art while still practicing the invention claimed herein.

We claim:

1. A method for optimizing the threshold settings of an optical scanner using a calibration sheet and a host computer connected to the scanner to establish threshold values and automatically set the scanner to the established threshold values, wherein the method comprises:

(a) providing the calibration sheet wherein the sheet has a multiplicity of straight lines substantially at an angle of forty five degrees to the direction of travel of the sheet through the scanner;

(b) determining a tolerance dot count ("TDC") for the calibration sheet, wherein for equivalent settings of the scanner dot counts from consecutive scans of the calibration sheet differ by no more than the tolerance dot count;

(c) calculating maximum and minimum dot counts for the calibration sheet;

(d) setting an upper threshold target dot count ("UTDC") for the calibration sheet at about the maximum dot count minus the tolerance dot count;

(e) setting a lower threshold target dot count ("LTDC") for the calibration sheet at about the minimum dot count plus the tolerance dot count;

(f) determining a processed video threshold target dot count ("PTDC") by repetitively comparing the results of several consecutive scans of the calibration sheet for different processed video thresholds until the image obtained by the scanner is consistently of the required quality;

(g) establishing lower, upper and processed threshold final values by using the host computer, wherein the method further comprises:

(i) determining the lower threshold final value by varying the lower threshold ("LTH") and upper threshold ("UTH"), scanning the calibration sheet to obtain a scan dot count, calculating the difference between the scan dot count and the LTDC, continuing to vary LTH and UTH until the difference is less than the tolerance plus one at which point the LTH final value is established;

(ii) determining the upper threshold final value by varying the upper and lower thresholds, scanning the calibration sheet to obtain a scan dot count, calculating the difference between the scan dot count and the UTDC, continuing to vary UTH and LTH until the difference is less than the tolerance plus one at which point the UTH final value is established;

(iii) determining the processed video threshold ("PTH") final value by varying the processed video threshold, wherein the upper and lower thresholds ar set to and maintained at their respective final values, scanning the calibration sheet to obtain a scan dot count, calculating the difference between the scan dot count and the PTDC, continuing to vary the PTH until the difference is less than the tolerance plus on for two successive scans at a particular PTH value and the scan dot count for the two successive scans differs by no more than a predetermined amount which is less than the tolerance dot count at which point the current PTH is stored as the PTH final value.

2. A method for optimizing the use of multiple optical scanners comprising the steps of:

(a) providing a calibration sheet wherein the sheet has a multiplicity of straight lines substantially at an angle of forty five degrees to the direction of travel of the sheet through the scanner;

(b) scanning the calibration sheet on a first scanner to obtain a dot count for the calibration sheet; and (c) scanning the calibration sheet on the other scanners and adjusting said other scanners so that the dot count obtained by these other scanners is about equal to the dot count of the first scanner.

3. A method for optimizing the threshold settings of an optical scanner using a calibration sheet and a host computer connected to the scanner to establish threshold values and automatically set the scanner to the established threshold values, wherein the method comprises:

(a) providing the calibration sheet wherein the sheet has a multiplicity of straight lines substantially at an angle of forty five degrees to the direction of travel of the sheet through the scanner;

(b) determining a tolerance dot count ("TDC") for the calibration sheet, wherein for equivalent settings of the scanner dot counts from consecutive scans of the calibration sheet differ by no more than the tolerance dot count;

(c) calculating maximum and minimum dot counts for the calibration sheet;

(d) setting an upper threshold target dot count ("UTDC") for the calibration sheet at about the maximum dot count minus the tolerance dot count;

(e) setting a lower threshold target dot count ("LTDC") for the calibration sheet at about the minimum dot count plus the tolerance dot count;

(f) determining a processed video threshold target dot count ("PTDC") by repetitively comparing the results of several consecutive scans of the calibration sheet for different processed video thresholds until the image obtained by the scanner is consistently of the required quality;

(g) establishing lower, upper and processed threshold final values by using the host computer, wherein the method further comprises:

(i) scanning the calibration sheet once and storing the results of the scanner's analogue to digital converters ("ADCs") output for the scan in the host computer's memory;

(ii) determining the lower threshold final value by varying the lower threshold ("LTH") and upper threshold ("UTH"), processing the stored ADCs' output to determine a scan dot count, calculating the difference between the scan dot count and the LTDC, continuing to vary LTH and UTH until the difference is less than the tolerance plus one at which point the LTH final value is established;

(iii) determining the upper threshold final value by varying the upper and lower thresholds, processing the stored ADCs' output to determine a scan dot count, calculating the difference between the scan dot count and the UTDC, continuing to vary UTH and LTH until the difference is less than the tolerance plus one at which point the UTH final value is established;

(iv) determining the processed video threshold ("PTH") final value by varying the processed video threshold, wherein the upper and lower thresholds ar set to and maintained at their respective final values, processing the stored ADCs' output to determine a scan dot count, calculating the difference between the scan dot count and the PTDC, continuing to vary the PTH until the difference is less than the tolerance plus one for two successive scans at a particular PTH value and the scan dot count for the two successive scans differs by no more than a predetermined amount which is less than the tolerance dot count at which point the current PTH is stored as the PTH final value.

* * * * *